May 20, 1930.  G. T. VOORHEES  1,759,176
CONTAINER
Filed Oct. 24, 1927
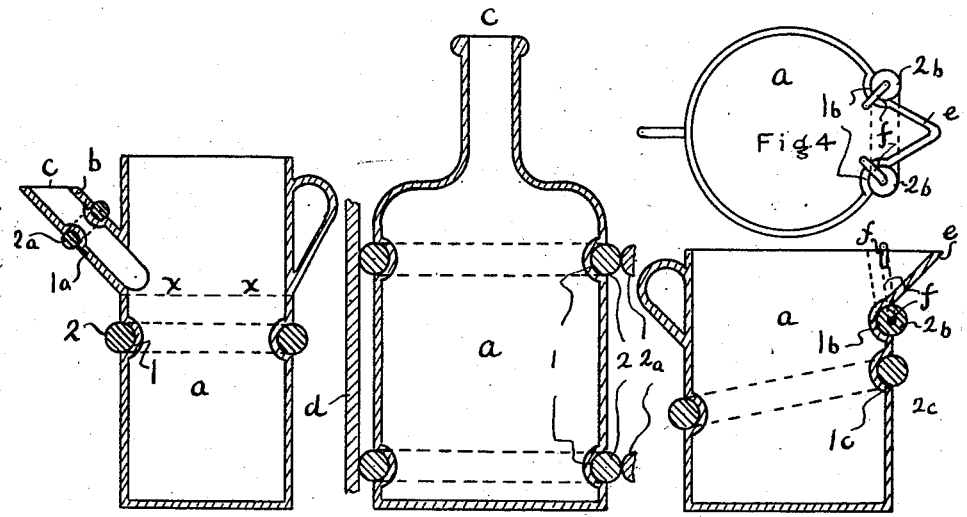
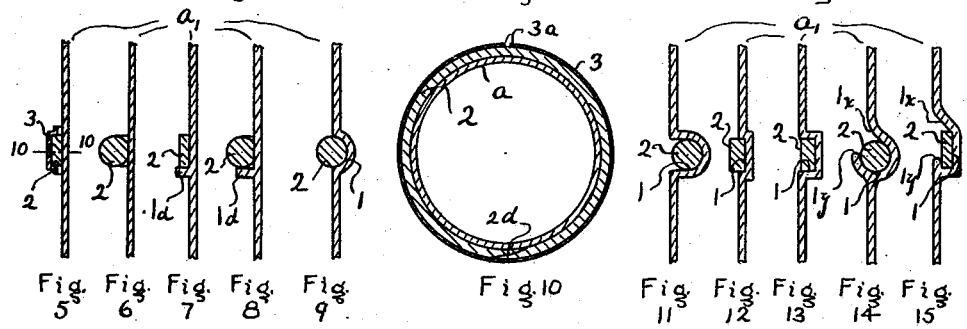
Gardner Tufts Voorhees
INVENTOR Patented May 20, 1930

1,759,176

UNITED STATES PATENT OFFICE

GARDNER TUFTS VOORHEES, OF BOSTON, MASSACHUSETTS

CONTAINER

Application filed October 24, 1927. Serial No. 228,310.

My invention relates to containers of any desired kind, particularly to containers for liquids and has for its objects the prevention of drip from the outlet of a container to a lower portion thereof and further to prevent fragile containers from being fractured during shipment.

I attain these results by placing a band or bands, preferably of absorbent, elastic, washable material below a container's outlet and around all or a part thereof.

Liquid containers of any desired shape or size for any desired purpose may be used with this invention, such for example, as bottles of all descriptions, all kinds of vases, all types of pitchers, tea-pots, coffee pots, cocoa pots, all kinds of drinking glasses, oil and vinegar cruets, etc. All so as to prevent or lessen the drip from the edge of an outlet of a container, after a liquid has been poured therefrom, down on the lower portion of the container, on to wood or fabrics on which the container may be set down, such for example, as on table tops, table cloths, mats, etc. Further, that parts thereof may be readily replaced when desired or washed so as to make any such container more cleanly, sanitary, convenient, attractive and desirable.

In the figures, Figs. 1, 2, 3 are sectional elevations of containers. Fig. 4 is a plan view of Fig. 3. Figs. 5, 6, 7, 8, 9 are part sectional elevations thru a wall of a container. Fig. 10 is a cross section thru a container taken on line 10, 10 of Fig. 5. Figs. 11, 12, 13, 14, 15 are part sectional elevations thru a wall of a container.

In Fig. 1, a vessel $a$ has a snout $b$ and one or more grooves $1^a$ and 1 adapted to hold bands $2^a$ and 2, preferably of absorbent material and preferably elastic, adapted to hub vessel $a$ in grooves $1^a$ and 1, all so adapted that liquid poured from snout $b$ runs down the side thereof and is prevented from going further by being absorbed in drip absorbing band $2^a$ or 2 or both. The location of these absorbent bands may be at any desired position except that band $2^a$ is naturally below snout outlet $c$ and band 2 is below the lower portion of snout $b$. Vessel $a$ may be cut off on line $x$ $x$ so that the portion below $x$ $x$ then forms a drinking glass, where band 2 is its drip band.

In Fig. 2, container $a$ may be a bottle or vase or any other similar container adapted to contain a liquid to be poured out therefrom thru its opening $c$. 1, 1 are one or more grooves formed on the outside of container $a$, adapted to retain drip bands 2, 2. Drip bands 2, 2 being adapted to hug said container and to absorb drip therein that tends to run down the container's sides from its outlet $c$. Bands 2, 2 may also serve as shock absorbers for a vessel when it is made of glass or other fragile material and may contact with other containers or similar bands thereon, as with bands $2^a$, $2^a$ or may contact with the side of a shipping container $d$, as shown. Such a fragile container with one or more like containers or only a single container will constitute a simple and safe shipping package for transit in the mails.

In Figs. 3 and 4, container $a$ has a nose $e$ and one or more drip bands $2^b$, $2^c$. $2^b$ may be in a groove $1^b$ and may have a spring means as wire $f$ adapted to so hold it as to hug the container's sides below and on the sides of nose $e$. Drip band $2^c$ has groove $1^c$ which is so formed as to slant away from nose $e$ so as to offer more absorbent capacity for drip from nose $e$ when either band $2^b$ or $2^c$ are used together or when band $2^c$ is used alone.

These bands 2, when used for drip bands or for combined drip and shock bands are preferably of absorbent material and of any desired cross section or width and preferably entirely surround the outer sides of a container and are preferably either elastic or provided with spring means or both to cause them to hug the outer walls of the container and are preferably provided with grooves to keep them in a desired location or to locate them in a desired position on the container or both. Or else I provide a rib or projection, in place of the groove, on the walls of the container. Grooves may be of any desired shape or contour and may be specially adapted to conduct drip and to help hold drip in the bands. Said bands are preferably of a washable material, so as to be cleaned, and are preferably endless bands, altho they may have bevelled or straight abutting ends.

In Figs. 5, 6, 7, 8, 9, 10, 11, 12, 13, 14, 15 $a'$ is a section of a wall of a container. 1 is a groove or projection thereon. 2 is an absorbent drip band.

In Fig. 5, band 2 of rectangular cross section hugs wall $a$, which has no groove and may be forced against said wall by its elasticity or by spring means 3, further described in Fig. 10. In Fig. 6, band 2 has no groove and is of circular or elliptical cross section and hugs wall $a'$ by its elastic pressure or could have a spring like 3 of Fig. 5.

In Figs. 7 and 8, nubs or projections $1^d$ serve to provide a means for placing bands 2 in a desired position against them.

The absorbing bands 2 may project beyond the walls of the container as in Fig. 9 or the container's walls may project beyond the drip band as in Fig. 11.

Fig. 10 shows a cross section of a container $a$ and a drip band 2, which may be endless or joined as at $2^d$ and may be pressed against container $a$ by spring 3 which may be open at $3^a$.

Figs. 9 and 11 show bands of circular or elliptical cross section and Figs. 12 and 13 show bands of rectangular cross section where the bands of Figs. 9 and 12 project beyond the walls and where the walls of Figs. 11 and 13 project beyond the bands, the bands being numbered 2 in their grooves.

In Figs. 14 and 15, grooves 1 are shown as having set back portions $1^x$, adapted to guide drip of liquid into better contact with drip bands 2, the sides $1^y$ being projected upwards to better retain excess liquid in bands 2. For constructional reasons and for reducing cooling strains, I prefer to employ grooves, as shown in the figures, whose walls are of substantially the same thickness as the walls of the container and I prefer that the groove shall extend inwardly from the outer surface of the container.

What I claim is:

1. The combination in a container having an outlet, a base and a containing wall, joining them, adapted to stand in a substantially vertical position, with its outlet above its base, when its base rests on a substantially horizontal support, of a groove in and encompassing said wall, located above said base and below said outlet, said groove's wall being of substantially the same thickness as said containing wall, said groove being adapted to retain an absorbent band adapted to prevent liquid drip from said outlet from flowing down said containing wall onto said support.

2. The combination in a container having an outlet, a base and a containing wall, joining them, adapted to stand in a substantially vertical position, with its outlet above its base, when its base rests on a substantially horizontal support, of a groove in and encompassing said wall, located above said base and below said outlet, all of said groove being substantially inside of said containing wall's outer surface, said groove being adapted to retain on absorbent band adapted to prevent liquid drip from said outlet from flowing down said containing wall onto said support.

3. The combination in a container having an outlet, a base and a containing wall, joining them, adapted to stand in a substantially vertical position, with its outlet above its base, when its base rests an a substantially horizontal support, of a groove in and encompassing said wall located above said base and below said outlet, said groove's wall being of substantially the same thickness as said containing wall, said groove being adapted to retain an absorbent band, an absorbent band for said groove, adapted to prevent liquid drip from said outlet from flowing down said containing wall onto said support.

4. The combination in a container having an outlet, a base and a containing wall, joining them, adapted to stand in a substantially vertical position, with its outlet above its base, when its base rests on a substantially horizontal support, of a groove in and encompassing said wall located above said base and below said outlet, the inside of said groove being substantially inside of said containing wall's inner surface, said groove being adapted to retain an absorbent band, an absorbent band for said groove adapted to prevent liquid drip from said outlet from flowing down said containing wall onto said support.

5. The combination of a container and an absorbent band, the container having a base and adapted to rest thereon, on a substantially horizontal surface and having a groove in and encompassing its outer wall adapted to contain the absorbent band, the groove and absorbent band being so disposed as to cause the band to hug the inner surface of the groove to prevent drip past the inner part of the band, and the inner part of the groove, the band extending outwardly beyond the outer surface of the container to prevent drip from the upper part of the groove from falling past said band.

6. In a container the combination of a groove located above a base of the container and encompassing the container and an absorbent band in and encompassing the groove and extending outwardly beyond the outer surface of the container and hugging the inner wall of the groove, all being adapted to prevent drip from an outlet of the container from running down its sides to its base by having its flow progress interrupted by the band, and by being absorbed and retained therein.

7. In a drip preventing groove, encompassing a container, located at a distance above its base, a raised outer portion thereof extending above its lower portion being adapted to help retain a liquid which has been absorbed in an absorbent band therein.

8. A container having a drip preventing groove and an absorbent band therein, the groove being at a distance above a base of the container and having an upwardly projecting portion higher than its lower portion.

GARDNER TUFTS VOORHEES.